United States Patent
Nakamura et al.

(10) Patent No.: US 6,646,748 B2
(45) Date of Patent: Nov. 11, 2003

(54) SURFACE PROFILE MEASUREMENT APPARATUS

(75) Inventors: Taizo Nakamura, Kawasaki (JP); Yoshio Saruki, Kawasaki (JP); Tatsuya Narumi, Kawasaki (JP); Yasushi Fukumoto, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 191 days.

(21) Appl. No.: 09/921,582

(22) Filed: Aug. 6, 2001

(65) Prior Publication Data

US 2002/0018215 A1 Feb. 14, 2002

(30) Foreign Application Priority Data

Aug. 8, 2000 (JP) ........................................ 2000-239286

(51) Int. Cl.⁷ ................................................. G01B 9/02
(52) U.S. Cl. ....................................................... 356/513
(58) Field of Search ............................... 356/512, 513, 356/FOR 119

(56) References Cited

U.S. PATENT DOCUMENTS 6,195,168 B1 * 2/2001 De Lega et al. ............ 356/497

OTHER PUBLICATIONS

Bulletin of NRLM, vol. 18, No. 4, pp. Pp. 76–99 (w/abstract).

* cited by examiner

*Primary Examiner*—Samuel A. Turner
*Assistant Examiner*—Patrick Connolly
(74) *Attorney, Agent, or Firm*—Oliff & Berridge, PLC (57) ABSTRACT

To provide a surface profile measurement apparatus capable of efficient measurement of the surface profile of an object. A diamond indenter (16) is movably mounted. The tip end of the diamond indenter (16) is irradiated by light, and the light reflected by the tip end (17) is condensed through a lens (46). The condensed light is observed by a photo sensor (42) for measurement of the curvature radius of the tip end (17). Meanwhile, the light reflected by the tip end (17) and the light reflected by a reference body (66) together cause an interference fringe. The interference fringe is observed by a CCD camera (44) to measure the surface profile of tip end (17).

10 Claims, 8 Drawing Sheets

SURFACE PROFILE MEASUREMENT APPARATUS

BACKGROUND OF THE INVENTION

1. Field of the Invention

The present invention relates to a surface profile measurement apparatus, and in particular to a surface profile measurement apparatus for measuring the profile of a surface of an object having a curvature.

2. Description of the Related Art

Conventionally, a profile of a surface of an object, including roughness, irregularities, and shape, has been measured using various optical apparatuses. In a typical example of such measurement, a reference plane is provided with respect to the surface of the object, and an interference fringe caused by light reflected by the surface and by the reference plane is studied to measure the surface profile of the object.

For example, the shape of a diamond indenter for use in measurement of the hardness of mechanical parts and so on may be measured. In a Rockwell hardness testing apparatus, a diamond indenter is pressed onto the surface of an object so that the hardness of the object is measured based on the depth of a concave resulted on its surface. The diamond indenter to be pressed onto the object has a cone shape with a vertex of 120° having a spherical tip end of a curvature radius 0.2 mm. In hardness measurement, measure of precision of the vertex angle and curvature radius of the cone must be precisely estimated before actual hardness measurement as these values severely affect the measurement result.

A known apparatus for measuring the vertex angle of a cone is a microscopic interferometer (Bulletin of NRLM Vol. 18, No. 4, p. 87). This apparatus measures a vertex angle of a cone based on an interference fringe caused by a reference plane and a generatrix portion of the cone.

The curvature radius of a spherical tip end can be measured using an interferometer. Alternatively, it can be measured using a micro-collimation method, disclosed in Bulletin of NRLM (Vol. 18, No. 4, p. 79). A micro-collimation method utilizes the fact the maximum light intensity is observed when the light is focused onto the tip end of a spherical surface and the curvature center of the tip.

The above described measurement of a diamond indenter, however, requires different apparatuses for measurements of a curvature radius of a cone and of the vertex angle of the same. As a result, an object diamond indenter must be mounted to a different apparatus for every measurement and a setting error must be evaluated for every measurement. This leads to a problem that a relatively long time is required to complete procedures such as the setting of an object and measurement.

SUMMARY OF THE INVENTION

The present invention has been conceived to overcome the above problems and aims to provide a surface profile measurement apparatus for efficiently measuring the surface profile of an object.

Another object of the present invention is to provide a surface profile measurement apparatus suitable for use in measurement of the surface profile of an indenter for use in hardness measurement.

In order to achieve the above objects, according to the present invention, there is provided a surface profile measurement apparatus for measuring surface profile of an object having a surface with a curvature and mounted movably, comprising an interference optical system for forming an interference fringe created by light from a light source reflected by the object and light from the light source reflected by a reference body; a surface profile measurement section for measuring the surface profile of the object based on the interference fringe; a condenser optical system for condensing the light reflected by the object; and a curvature radius measurement section for measuring a curvature radius of the object based on variation of the light condensed by the condenser optical system, while translationally moving the object.

The above structure enables measurement of a surface profile of an object and measurement of a curvature radius of a portion of an object having a curvature, using the surface profile measurement apparatus of the present invention.

It should be noted that "a surface with a curvatures" as used here refers to a portion of a surface of an object, which could roughly be consider as a section of a sphere. It should be further noted that "surface profile" refers here to information concerning the characteristics, such as roughness, irregularity, and shape.

A path along which the light irradiates the object in the condenser optical system and a path along which the light irradiates the object in the interference optical system may preferably coincide. This structure enables reduction of an error caused in setting an object, for example, and the number of parts constituting the optical system.

Preferably, the reference body may include a plurality of reference body pieces which are mutually switchable by means of reference body switching means. This structure enables highly accurate measurement as it allows switching of reference bodies according to the surface profile of an object to be measured.

The apparatus may further preferably comprise measurement switching means for switching measurement of the curvature radius of the object and measurement of the surface profile of the object. This structure enables curvature radius measurement and surface profile measurement independently.

Still further, the object may be mounted allowing rotation around an axis thereof.

Yet further, the object may be mounted allowing rotation around an axis vertical to an optical axis of the light irradiating the object. Because such a structure allows an object to be rotated, a larger portion of the surface of the object can be measured.

Preferably, the object may have a conical shape, and the surface profile measurement section may measure a vertex angle of the cone-shaped object based on variation of the interference fringe caused as the object rotates. This structure enables measurement of the vertex angle of a cone.

According to another aspect of the present invention, there is provided a surface profile measurement apparatus for measuring surface profile of an object having a partially spherical tip end and a cone-shaped substrate and mounted movably, comprising an interference optical system for forming an interference fringe created by light from a light source reflected by the object and light from the light source reflected by a reference body; a surface profile measurement section for measuring the surface profile of the object based on the interference fringe; a condenser optical system for condensing the light reflected by the object; and a curvature radius measurement section for measuring a curvature radius of the object based on variation of the light condensed by the condenser optical system, while moving translationally moving the object, wherein the surface profile measurement section measures a vertex angle of the cone-shaped object based on variation of the interference fringe created as the object rotates around an axis vertical to an optical axis of light irradiating the object.

This structure enables measurement of the curvature radius of the tip end and the vertex angle of the cone portion of an object having a partially spherical tip end and a cone-shaped substrate.

According to still another aspect of the present invention, there is provided a surface profile measurement apparatus for measuring surface profile of an object having a partially spherical tip end and a cone-shaped substrate and mounted movably, comprising an interference optical system for forming an interference fringe created by light from a light source reflected by the object and light from the light source reflected by a reference body and a surface profile measurement section for measuring the surface profile of the object based on the interference fringe, wherein the reference body includes a reference surface and a reference sphere, which are mutually switchable by means of reference body switching means, and the surface profile measurement section measures an angle of a vertex of the cone-shaped object based on variation of an interference fringe created by the reference surface and the surface of the object, and measures surface profile of the partially spherical tip end of the object based on variation of an interference fringe created by the reference sphere and the object, both interference fringes being formed as the object rotates around an axis vertical to an optical axis of the light irradiating the object.

This structure enables measurement of the curvature radius of the tip end of an object having a partially spherical tip end and a cone-shaped substrate, and measurement of the vertex angle of the cone portion of the object.

The apparatus may further preferably comprise a condenser optical system for condensing light reflected by the object and a curvature radius measurement section for measuring a curvature radius of the object based on variation of the light condensed by the condenser optical system, while translationally moving the object.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENT

In the following, a preferred embodiment of the present invention (hereinafter referred to as the embodiment) will be described with reference to the accompanied drawings.

The surface profile measurement apparatus in this embodiment is used to measure a curvature radius, surface profile, and a vertex angle of the cone-shaped tip end, or the cone, of a Rockwell diamond indenter used as an example of an object of measurement.

Figure 1:
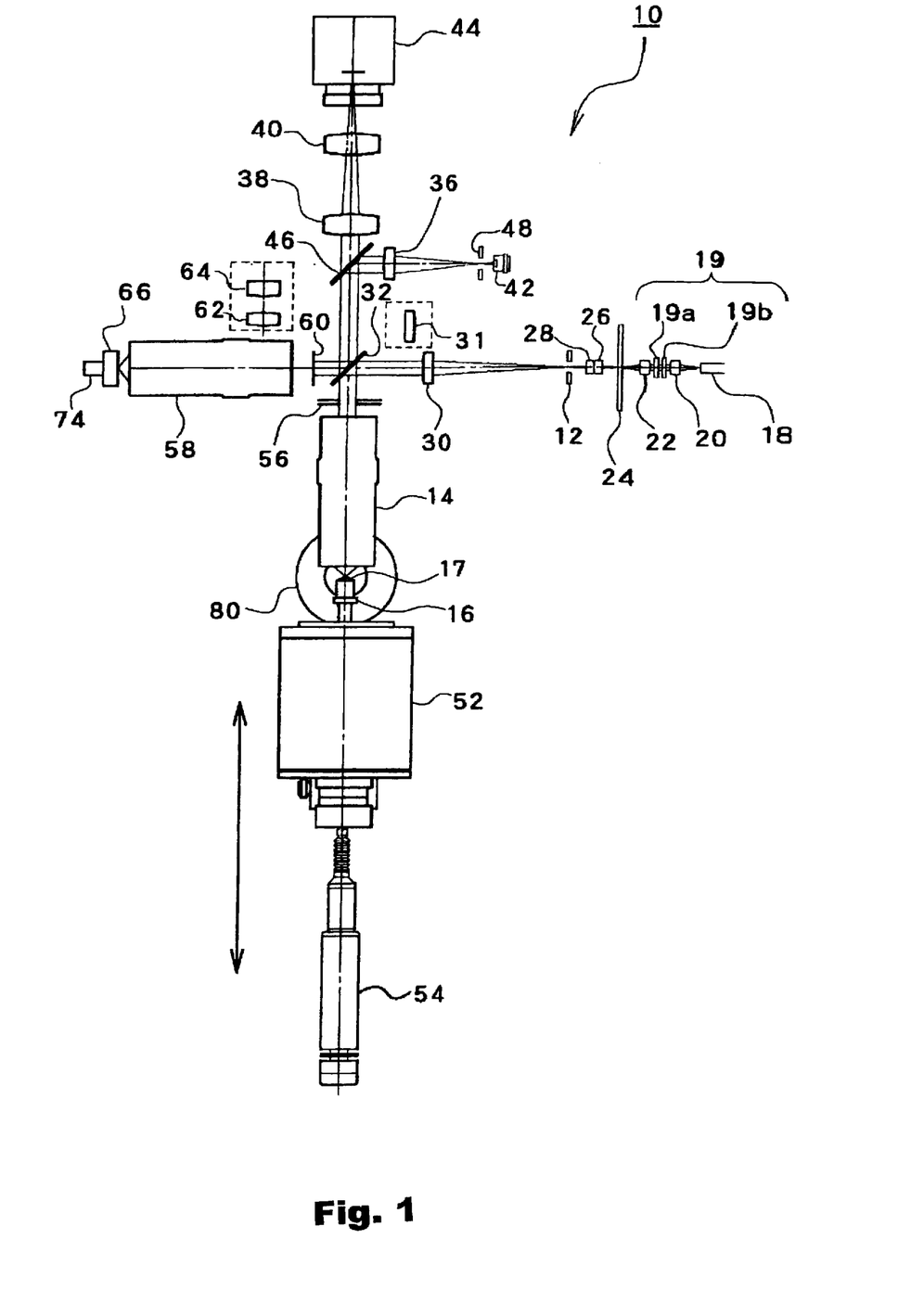
FIG. 1 is a diagram showing a structure of a surface profile measurement apparatus measuring a curvature radius of a tip end of a diamond indenter according to a preferred embodiment of the present invention.

FIG. 1 is a diagram showing a structure of a surface profile measurement apparatus 10 measuring a curvature radius of the tip end of a Rockwell diamond indenter, using a condenser optical system, in this example, a micro-collimation optical system.

During measurement, light emanating from a pin hole 12 is condensed through an object-side objective 14 before irradiating the tip end 17 of a diamond indenter 16.

In this example, the light from the pin hole 12 originates from an optical fiber 18, installed in the upstream of the pin hole 12. Light from the optical fiber 18 is condensed through the lenses 20, 22, which are installed sandwiching an optical isolator 19, and is thereafter diffused by a rotating diffuser 24. The optical isolator 19 comprises a polarizer 19a and a $\lambda/4$ wavelength panel 19b, and can adjust a light amount while rotating. The rotating diffuser panel 24 can also reduce interference noise. The diffused light is condensed through the lenses 26, 28 into the pin hole 12. The light emanating from the pin hole 12 is formed into a parallel luminous flux through the lens 30 before introduction to a beam splitter 32. The light introduced and reflected by the beam splitter 32 is condensed through the object-side objective 14 onto the tip end 17 of the diamond indenter 16.

The light irradiating the tip end 17 and reflected by the same returns through the object-side objective 14. A portion of the returning light is condensed through the lens 36 into a photo sensor 42, and the remainder of the light is condensed through the lenses 38, 40 into a CCD camera 44.

In the above, specifically, the light reflected by the tip end 17 of the diamond indenter 16 and returning through the object-side objective 14 is split by a beam splitter 46. One of the split optical fluxes is condensed through the lens 36 into a pin hole 48 and then detected by the photo sensor 42. The detected light is converted into an electric signal, which is supplied to an analyzing section 50 (see FIG. 8). The other of the split optical fluxes is condensed through the lenses 38, 40 into the CCD camera 44, as described above, and measured by the CCD camera 44.

Figure 2A:
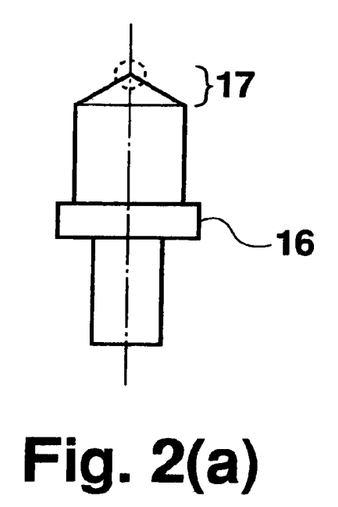
FIG. 2(a) is a side view of the diamond indenter.
Figure 2B:
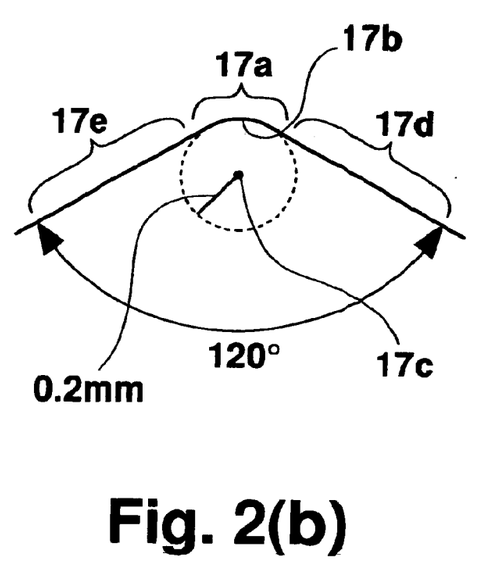
FIG. 2(b) is an enlarged view showing the tip end of the diamond indenter.

FIG. 2(a) is a side view of the diamond indenter 16. FIG. 2(b) is an enlarged diagram showing a portion (shown enclosed by the dotted line in FIG. 2(a)) of the tip end 17 of the diamond indenter 16. The tip end 17 has a conical shape with its point end 17a forming a part of a sphere having a predetermined curvature radius. The vertex angle of the cone is of approximately 120° and a curvature radius of the cone is approximately 0.2 mm.

Figure 3:
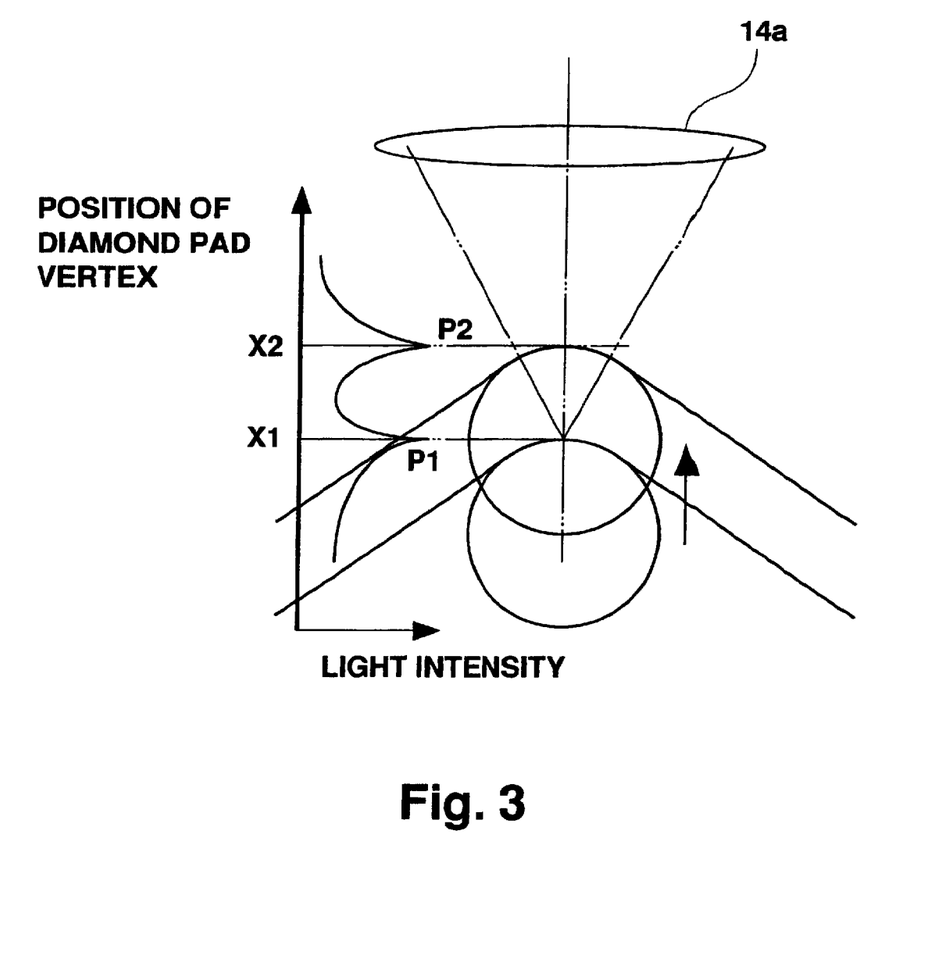
FIG. 3 is a diagram showing correlation between the position of the tip end of the diamond indenter and light intensity measured by a photo sensor according to the present invention.

Returning to FIG. 1, the diamond indenter 16 can be moved translationally by an inch worm motor 52 in parallel to the optical axial direction of the light irradiating the object (see the arrow in FIG. 1). FIG. 3 is a graph showing variation of light intensity detected by the photo sensor 42 as the diamond indenter moves as described above. In the left half of FIG. 3, the ordinate represents the position of the vertex 17*b* of the diamond indenter 16 (see FIG. 2(*b*)), while the abscissa represents light intensity measured by the photo sensor 42. In the right half of FIG. 3 is shown a state in which the light condensed through the object-side objective 14 is focused onto the point end 17*a* of the diamond indenter 16. With an arrangement allowing the light to be focused onto the vertex 17*b* of the diamond indenter 16 through the lens 14*a* in the object-side objective 14 (corresponding to the vertex 17*b* positioned at X1, shown in the left half of FIG. 3), the light reflected by the vertex 17*b* would all return through the lens 14*a* for an ideally spherical tip end. The light intensity then observed by the photo sensor 42 would become extreme, forming a first peak P1 (see the left half of FIG. 3).

Subsequently, while the diamond indenter 16 is being advanced toward the lens 14*a* (see the arrow in the right half of FIG. 3), the light intensity once decreases to the minimum and then begins increasing until a second peak P2 is formed when the diamond indenter 16 has advanced to a point allowing the light to be focused at the curvature center 17*c* (corresponding to the vertex 17*b* positioned at X2, shown in the left half of FIG. 3). This fringe occurs because the light from the lens 14*a* is reflected in a direction opposite from that in which the light is incident (a regular reflection).

The distance between the peaks P1 and P2 is precisely measured using the linear encoder 54 shown in FIG. 1, whereby the value of the curvature radius of the point end 17*a* can be measured.

Returning to FIG. 1, an iris diaphragm 56 can vary the amount of light allowed through, and a diaphragm number of the iris diaphragm 56 is adjustable according to the size of the curved portion of the tip end 17 of the diamond indenter 16. The diaphragm number is set at its maximum of 0.65 in this example.

As described above, the light emanating from the pin hole 12 is split by the beam splitter 32. The split optical flux through the beam splitter 32 proceeding toward the reference body-side objective 58 is blocked by a shutter 60, which is made of a material with a high light absorption efficiency to prevent light reflection and interference with the light out of the object-side objective 14. As described later, the shutter 60 is used open in measurement of the surface profile of an indenter using an interference optical system.

That is, the shutter 60 partially bears the function of switching a condenser optical system for curvature radius measurement and an interference optical system for surface profile measurement.

Figure 4:
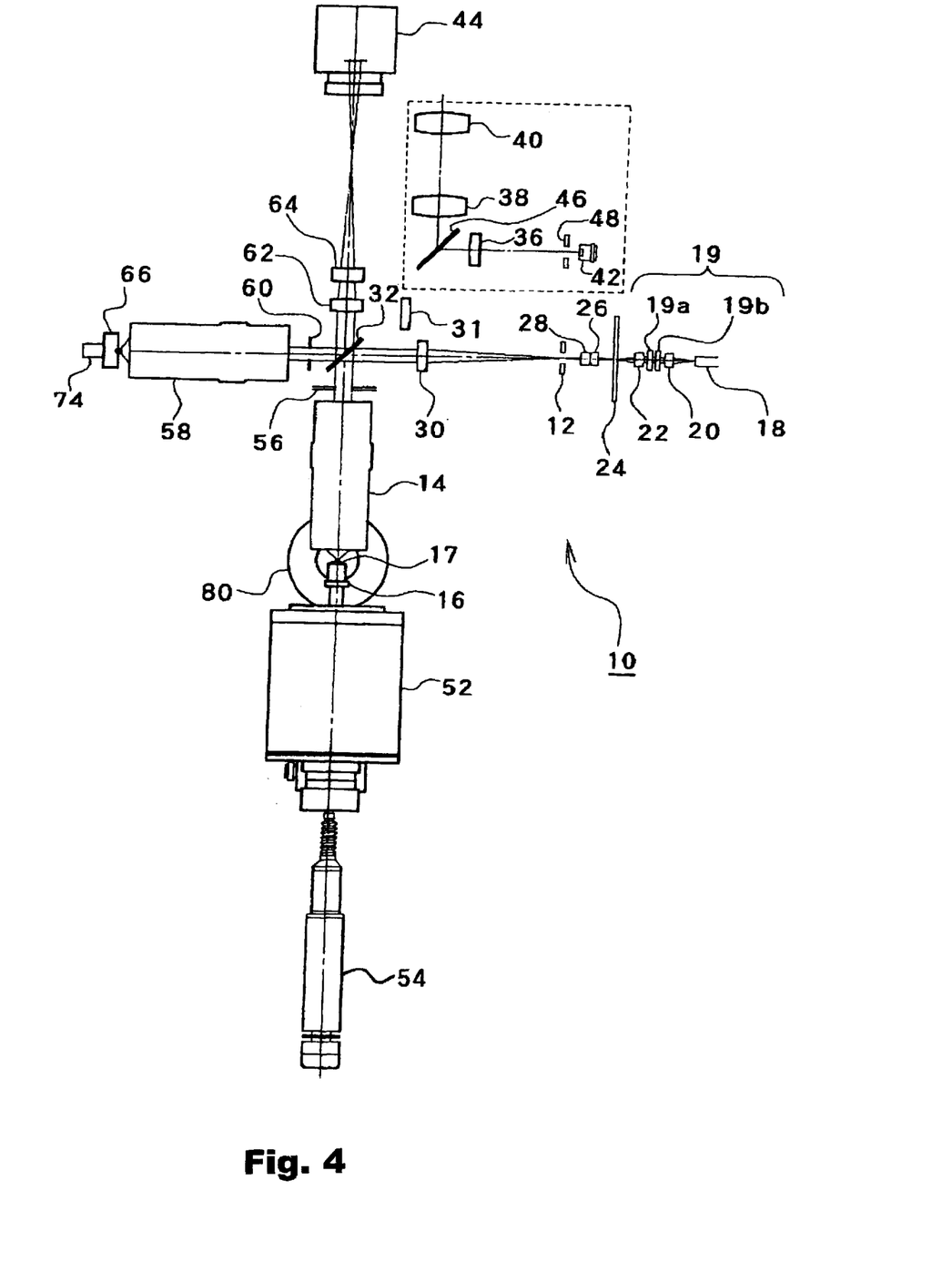
FIG. 4 is a diagram showing a structure of a surface profile measurement apparatus measuring the surface profile of the tip end of the diamond indenter.

FIG. 4 is a diagram showing a structure of the surface profile measurement apparatus 10 measuring the surface profile of the point end 17*a* of the diamond indenter 16 using a Linnik microscopic interference optical system utilizing a reference sphere.

The components shown enclosed by the dotted line in the drawing are used in curvature radius measurement but not in surface profile measurement. When switching measurement methods, relocation of optical devices and opening and closing of the shutter 60, as described above, and so forth may be performed manually or using a switch control mechanism, which is additionally provided.

In the interference optical system, the shutter 60 is used fully open.

The path of light from the optical fiber 18 being condensed into the pin hope 12, previously described in connection with FIG. 1, will not be described again here.

The light condensed into the pin hole 12 is formed into parallel optical flux through the lens 30, and then split into two optical fluxes by the beam splitter 32. One of the split optical fluxes is introduced into the object-side objective 14 and condensed onto the tip end 17 of the diamond indenter 16, while the other is introduced into the reference-side objective 58 and condensed onto the surface of a reference sphere.

The light irradiating the tip end 17 of the diamond indenter 16 is reflected by the same back toward the object-side objective 14, while the light toward the reference sphere is reflected back toward the reference body-side objective 58. The light returning from the object-side objective 14 and passing through the beam splitter 32 and the light returning from the reference body-side objective 58 and reflected by the beam splitter 32 both pass through the lenses 62, 64, causing an interference fringe to be observed by the CCD camera 44.

Figure 5A:
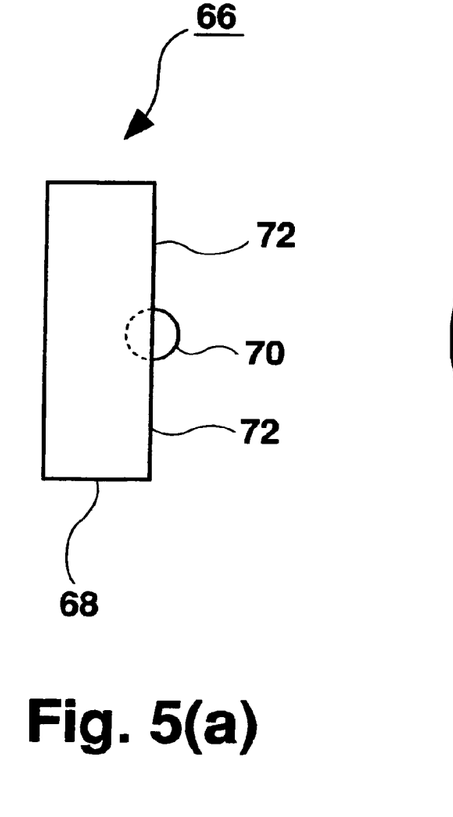
FIG. 5(a) is a side view of a reference body.
Figure 5B:
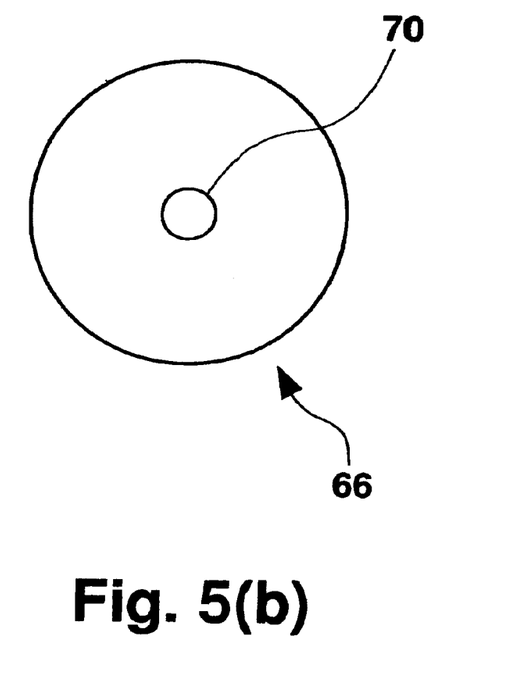
FIG. 5(b) is a front view of the reference body.

FIG. 5(*a*) and FIG. 5(*b*) are, respectively, side and front views of a reference body 66. In this example, the reference body 66 comprises a reference sphere 70 closely attached to a parallel plane substrate 68. The surface of the parallel plane substrate 68, where the reference sphere 70 is attached, is used as a reference surface 72 in measurement of the vertex angle of the cone-shaped tip end 17 of the diamond indenter 16, described later. Should the curvature radius of the point end 17*a* of the diamond indenter 16 and that of the reference sphere 70 differ from each other even slightly, an interference fringe commensurate with the difference in the curvature radius would be observed by the CCD camera 44. A fringe scan method is a known method for measuring the surface profile of an object utilizing an interference fringe. Specifically, in this method, the reference body 66 is subtly vibrated in the optical axial direction of the irradiating light using a PZT 74 to vary an interference fringe, and the resultant interference fringe is observed to measure the surface profile of the point end 17*a* thereupon.

Data on the surface profile obtained by the CCD camera 44 is analyzed in the analyzer 50 (see FIG. 8), so that surface information, such as information on a irregularities of the surface of the point end 17*a*, and a curvature and so forth at respective points on the tip ends 17*a* become available.

Figure 6:
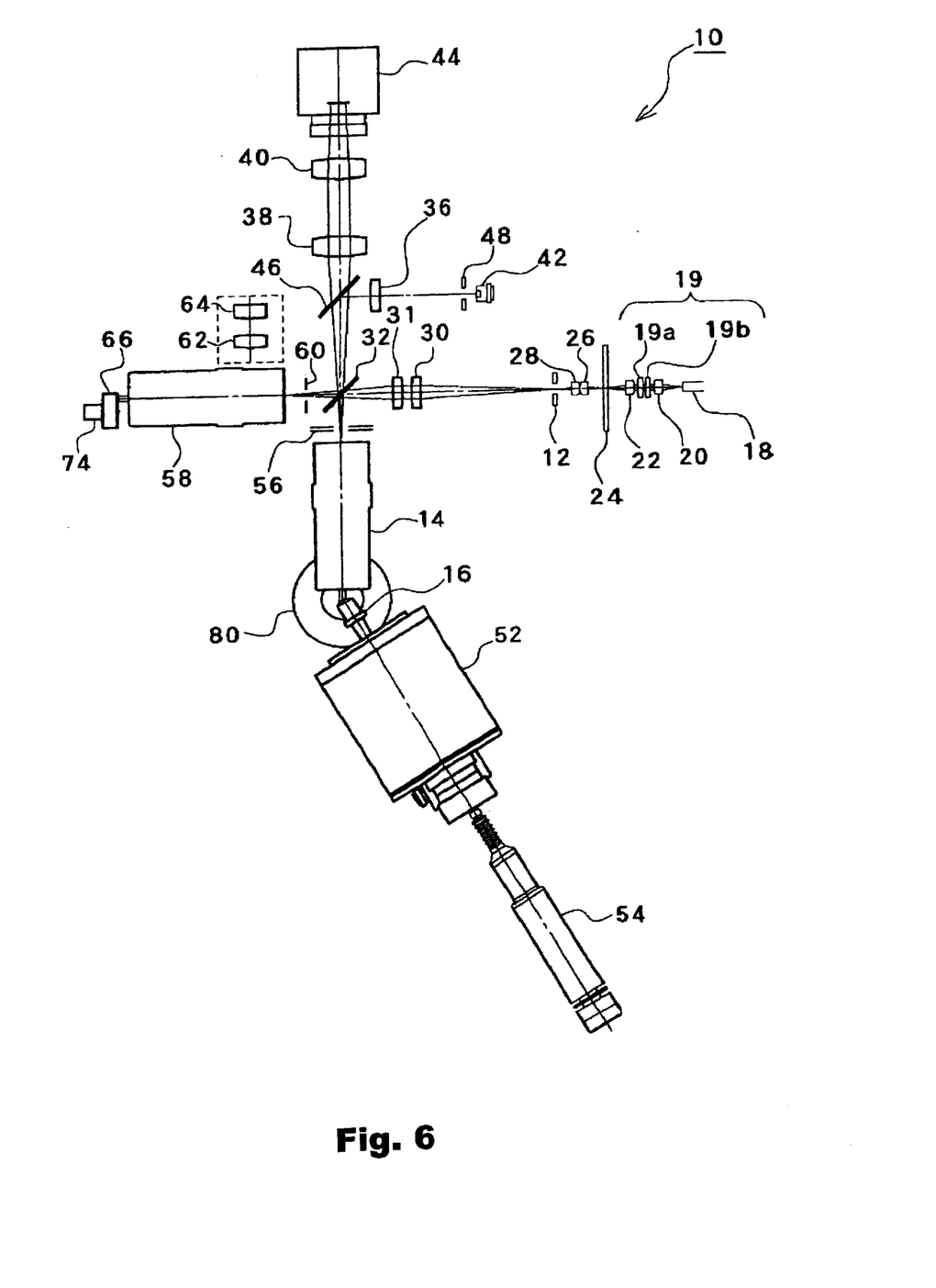
FIG. 6 is a diagram showing a structure of a surface profile measurement apparatus measuring the vertex angle of a cone-shaped tip end of a diamond indenter.

FIG. 6 is a diagram showing the structure of the surface profile measurement apparatus 10 measuring the vertex angle of the cone-shaped tip end 17 using a microscopic interference optical system utilizing the reference surface 72.

The components shown enclosed by the dotted line in the drawing are used in surface profile measurement using the reference sphere 70, described above, but not in vertex angle measurement for the cone. Measurement methods may be switched manually or using a switch control mechanism, which is additionally provided.

The path of light from the optical fiber 18 being condensed into the pin hole 12 will not be described here, as this path is as described in connection with FIG. 1.

The light condensed into the pin hole 12 is formed into parallel optical flux through the lens 30 and then desirably condensed through the lens 31 before being split into two optical fluxes by the beam splitter 32. One of the split optical fluxes is introduced into and condensed through the object-side objective 14 and then irradiates in the form of parallel optical flux the generatrix portion 17*d* (see FIG. 2(*b*)) of the cone-shaped tip end 17, while the other is introduced into and condensed through the reference-side objective 58 and irradiates in the form of parallel optical flux the reference surface 72.

Figure 8:
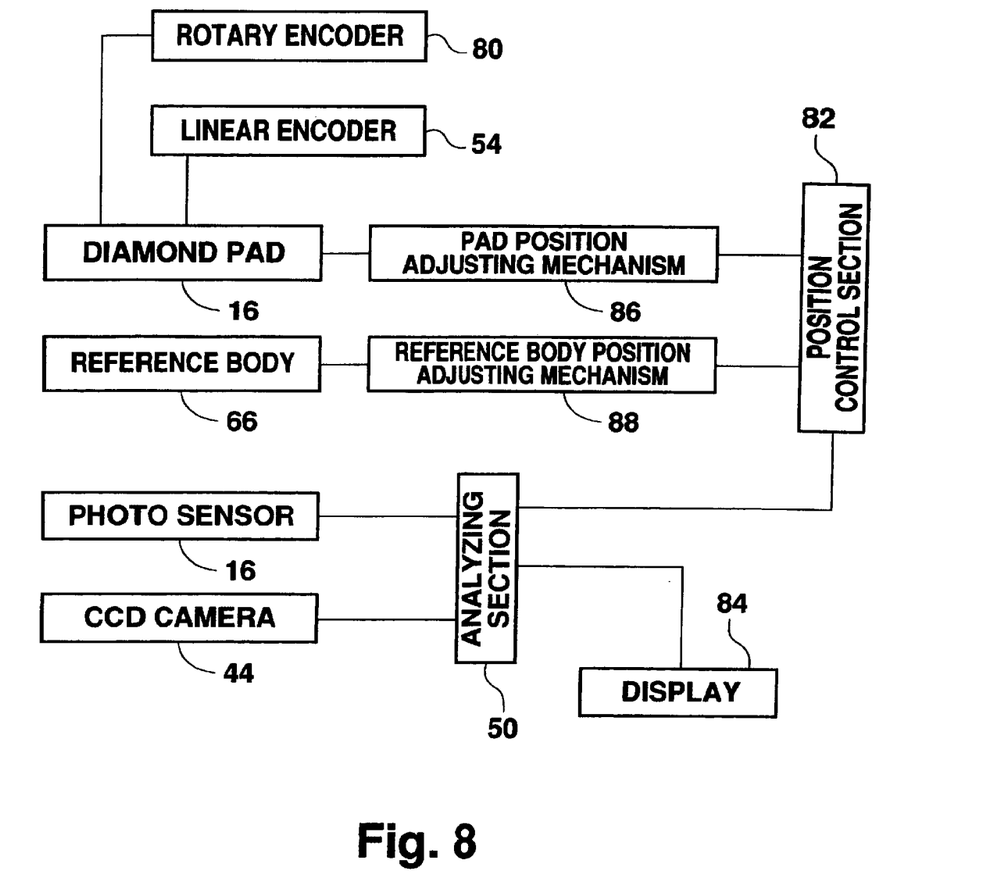
FIG. 8 is a diagram showing a position control section and an analyzing section.

Either reference sphere 70 or the reference surface 72 can be selected using a reference body position adjusting mechanism 88 (see FIG. 8). The selection is achieved using a means for moving the reference body 66 in a direction intersecting the optical axial direction of the irradiating light.

The diamond indenter 16 can rotate around the axis orthogonal to the optical axial direction of the irradiating light by the action of an indenter position adjusting mechanism 86. This enables easy change of the orientation of the diamond indenter 16 from a position with its point end 17a being irradiated to another with the generatrix portion 17d of its cone being irradiated, and resultantly can reduce the complexity associated with the setting of the object for every measurement.

The light irradiating the generatrix portion 17a of the diamond indenter 16 is reflected back toward the object-side objective 14, while the light irradiating the reference surface 72 is reflected back toward the reference body-side objective 58. The light returning from the object-side objective 14 and passing through the beam splitter 32 and the light returning from the reference body-side objective 58 and reflected by the beam splitter 32 both pass through the lenses 38, 40, causing an interference fringe to be observed by the CCD camera 44.

Figure 7:
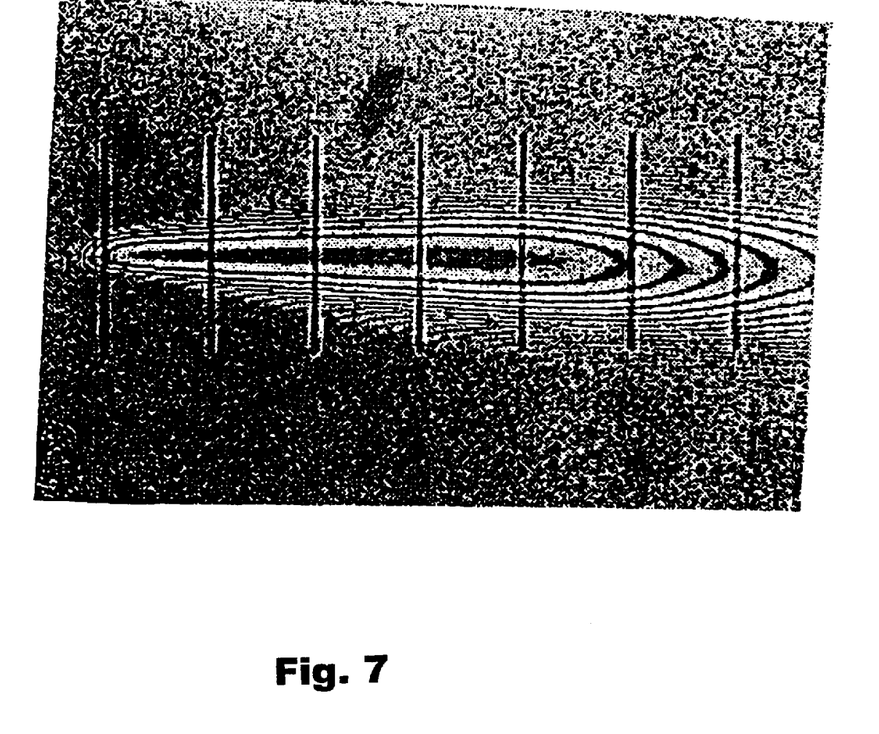
FIG. 7 is a diagram showing an interference fringe caused when using a reference surface.

The interference fringe, observed by the CCD camera 44, is constituted of elongated shapes, as shown in FIG. 7 (Bulletin of NRLM Vol. 18, No. 4, Page 89). Equidistant gauges are provided in the direction where the interference fringe extends, so that the length of the fringe can be measured.

By rotating the diamond indenter 16, it is brought into a position with the longest span of the interference fringe, where the optical axis of the irradiating light and the generatrix portion 17d of the cone together form a substantially right angle, and the position is determined as a base point. Subsequently, the diamond indenter 16 is rotated in the opposite direction until it comes to a position with another longest span of interference fringe, similar to the fringe observed at the base point, and that position is determined as an end point. The rotation angle between the base point and the end point is measured using an rotary encoder 80, and the vertex angle of the cone is calculated based on the rotation angle measured. The diamond indenter 16 positioned at the end point corresponds an arrangement where the optical axis of the irradiating light and the generatrix portion 17e of the cone (see FIG. 2(b)) together constitute a substantially right angle.

It should be noted that the diamond indenter 16 is rotatable around its axis indicated by the one dot broken line in FIG. 2(a), and the rotatable angle is determined such that the indenter position adjusting mechanism 86 can desirably rotate and support the diamond indenter 16. This arrangement enables measurement concerning a generatrix portion at any vertex angle around the axis of the diamond indenter.

FIG. 8 is a block diagram showing a structure of the analyzing section 50 and the position control section 82 in the embodiment.

The analyzing section 50, which is connected to the photo sensor 42, the CCD camera 44, the position control section 82, and a display 84, receives an optical intensity signal supplied from the photo sensor 42, image information concerning an interference fringe detected by and supplied from the CCD camera 44, and so on, and displays an image representative of varying intensity of the optical signal, an interference fringe, and so forth, on the display 84.

The position control section 82 is connected to the indenter position adjusting mechanism 86 and the reference body position adjusting mechanism 88. The reference body position adjusting mechanism 88 adjusts the position of the reference body 66. When switching measurements of the surface profile of the point end 17a of the diamond indenter 16 and of the vertex angle of the cone, the reference sphere 70 and the reference surface 72 are also switched. The switching is executed by the position control section 82 via the reference body position adjusting mechanism 88. The PZT 74, which subtly vibrates the reference body in measurement of the surface profile of the point end 17a, is a part of the reference body position adjusting mechanism 88 and operates under control of the position control section 82.

The indenter position adjusting mechanism 86 adjusts the position of the diamond indenter 16 and has four functions as described below. First, the indenter position adjusting mechanism 86 is able to displace a diamond indenter 16 over a plane vertical to the optical axial direction of irradiating light (hereinafter referred to as "within a vertical plane"). This displacement is achieved using a rough movement mechanism and a subtle movement mechanism. In this embodiment, the range of rough movement is within 5 mm, while that of subtle movement is within 20 $\mu$m. The subtle movement is achieved by a piezoelectric element. Using the piezoelectric element, the position control section 82 can control, with resolution of 0.01 $\mu$m, of movement of the diamond indenter within the vertical plane.

Second, the indenter position adjusting mechanism 86 is able to displace a diamond indenter 16 translationally movable in parallel to the axial direction of the irradiating light. This displacement is achieved using an inch worm motor 52 in this embodiment. Using the inch worm motor 52, the position control section 82 can control the position of the indenter with the resolution of 0.01 $\mu$m. In measurement of the curvature radius of an indenter, the analyzing section 50 can control the indenter position adjusting mechanism 86 based on the information concerning the light amount measured by the photo sensor 42, so as to automatically move the diamond indenter.

Third, the indenter position adjusting mechanism 86 can rotate the diamond indenter 16 around the indenter axis so that light can irradiate any generatrix portion on the indenter surface.

Fourth, the indenter position adjusting mechanism 86 can rotate the diamond indenter 16 around an axis vertical to the optical axis of the irradiating light. The indenter position adjusting mechanism 86 can rotate the diamond indenter 16 at ±30° relative to the optical axis of the irradiating light in this embodiment. This makes it possible to measure the vertex angle of the cone based on an interference fringe caused by the generatrix portion of the cone and the reference surface, as described above. In addition, the surface profile on the border between the spherical point end 17a and the generatrix portion of the cone can be measured based on an interference fringe caused by the generatrix portion and the reference body 66.

The linear encoder 54 is used to measure a distance in the axial direction of the irradiating light by which the diamond indenter has been moved, while the rotary encoder 80 is used to measure a rotary angle by which the diamond indenter has been rotated around the axis vertical to the optical axis of the irradiating light. Information concerning the distance and angle measured may be input as a signal to the position control section 82, so that the analyzing section 50 receives that information from the position control section 82 and outputs it to the display 84.

In addition, the analyzing section 50 analyzes the graph (see FIG. 3(a)) concerning correlation between the position of a diamond indenter and the intensity of an optical signal and phase information data concerning an interference fringe, supplied from the CCD camera 44, and outputs resultant data concerning a curvature radius, surface profile, vertex angle of the cone-shaped tip end 17 to the display 84.

It should be noted that the analyzing section 50 and the position control section 82 may be formed separately, as described above, or integrally.

In this embodiment, because the optical axis of light irradiating the diamond indenter 16 for curvature radius measurement using a condenser optical system and that for surface profile measurement and vertex angle measurement both using an interference optical system are the same, the time required to complete setting of the object for the respective measurements when successively conducted, can be reduced significantly.

Different light sources may be used for the respective measurements. Specifically, to measure a very fine structure, such as roughness, on the surface of an object, light source with different wavelengths and coherent may be provided to the condensed and interference optical systems depending on the purpose.

As described above, the present invention can present a surface profile measurement apparatus capable of efficient measurement of the surface profile of an object. In addition, the present invention can provide a surface profile measurement apparatus suitable for use in measurement of the surface profile of an indenter for use in hardness measurement.

What is claimed is:

1. A surface profile measurement apparatus for measuring a surface profile of a movably mounted object having a curved surface, comprising:
    an interference optical system for forming an interference fringe of light from a light source reflected by the object and light from the light source reflected by a reference body;
    a surface profile measurement section for measuring the surface profile of the object based on the interference fringe;
    a condenser optical system for condensing the light reflected by the object; and
    a curvature radius measurement section for measuring a curvature radius of the object based on variation of the light condensed by the condenser optical system, the variation of the light having a first peak and a second peak while the object is translationally moving, the curvature radius measurement section measuring a curvature radius based on a distance between the first peak and the second peak.

2. An apparatus according to claim 1, wherein a path along which the light irradiates the object in the condenser optical system and a path along which the light irradiates the object in the interference optical system coincide.

3. An apparatus according to claim 1, wherein the reference body includes a plurality of reference body pieces which are mutually switchable by means of reference body switching means.

4. An apparatus according to claim 1, further comprising: measurement switching means for switching measurement of the curvature radius of the object and measurement of the surface profile of the object.

5. An apparatus according to claim 1, wherein the object is mounted allowing rotation around an axis thereof.

6. An apparatus according to claim 1, wherein the object is mounted allowing rotation around an axis vertical to an optical axis of the light irradiating the object.

7. An apparatus according to claim 6, wherein the object has a cone shape, and the surface profile measurement section measures a vertex angle of the object in the cone shape based on variation of the interference fringe caused as the object rotates.

8. A surface profile measurement apparatus for measuring a surface profile of an object having a partially spherical tip end and a conical substrate and mounted movably, comprising:
    an interference optical system for forming an interference fringe of light from a light source reflected by the object and light from the light source reflected by a reference body;
    a surface profile measurement section for measuring the surface profile of the object based on the interference fringe;
    a condenser optical system for condensing the light reflected by the object; and
    a curvature radius measurement section for measuring a curvature radius of the object based on variation of the light condensed by the condenser optical system, while translationally moving the object
    wherein
        the surface profile measurement section measures a conical vertex angle of the object based on variation of the interference fringe created as the object rotates around an axis vertical to an optical axis of light irradiating the object.

9. A surface profile measurement apparatus for measuring surface profile of an object having a partially spherical tip end and conical substrate and mounted movably, comprising:
    an interference optical system for forming an interference fringe of light from a light source reflected by the object and light from the light source reflected by a reference body;
    a surface profile measurement section for measuring the surface profile of the object based on the interference fringe;
    wherein
        the reference body includes a reference surface and a reference sphere, which are mutually switchable by means of reference body switching means, and
        the surface profile measurement section measures an angle of a conical vertex of the object based on variation of an interference fringe created by the reference surface and the surface of the object, and measures surface profile of the partially spherical tip end of the object based on variation of an interference fringe created by the reference sphere and the object, the interference fringes both being formed as the object rotates around an axis vertical to an optical axis of the light irradiating the object.

10. An apparatus according to claim 9, further comprising:
    a condenser optical system for condensing light reflected by the object; and
    a curvature radius measurement section for measuring a curvature radius of the object based on variation of the light condensed by the condenser optical system, while translationally moving the object.

* * * * *